United States Patent
Mizuno (10) Patent No.: US 11,504,616 B2
(45) Date of Patent: *Nov. 22, 2022

(54) METHOD OF CONTROLLING A SERVER, SERVER, AND NON-TRANSITORY COMPUTER-READABLE RECORDING MEDIUM

(71) Applicant: GREE, Inc., Tokyo (JP)

(72) Inventor: Shinji Mizuno, Tokyo (JP)

(73) Assignee: GREE, INC., Tokyo (JP)

( * ) Notice: Subject to any disclaimer, the term of this patent is extended or adjusted under 35 U.S.C. 154(b) by 207 days.

This patent is subject to a terminal disclaimer.

(21) Appl. No.: 16/778,362

(22) Filed: Jan. 31, 2020

(65) Prior Publication Data

US 2020/0164271 A1 May 28, 2020

Related U.S. Application Data

(63) Continuation of application No. 14/808,386, filed on Jul. 24, 2015, now Pat. No. 10,589,170.

(30) Foreign Application Priority Data

Jul. 25, 2014 (JP) ................. 2014-152140

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/35* | (2014.01) |
| *A63F 13/65* | (2014.01) |
| *A63F 13/795* | (2014.01) |

(52) U.S. Cl.
CPC .............. *A63F 13/35* (2014.09); *A63F 13/65* (2014.09); *A63F 13/795* (2014.09)

(58) Field of Classification Search
CPC ... G07F 17/32; G07F 17/3211; G07F 17/3213
USPC ................ 463/16, 17, 20, 22, 25, 39, 40, 42
See application file for complete search history.

(56) References Cited

U.S. PATENT DOCUMENTS

| | | | |
|---|---|---|---|
| 5,931,468 | A | 8/1999 | Orolin |
| 6,511,375 | B1 | 1/2003 | Kaminkow |
| 6,755,737 | B2 | 6/2004 | Jackson et al. |
| 6,796,901 | B2 | 9/2004 | Baerlocher |

(Continued)

FOREIGN PATENT DOCUMENTS

| | | |
|---|---|---|
| JP | 2006-081674 A | 3/2006 |
| JP | 2013059569 A | 4/2011 |

(Continued)

OTHER PUBLICATIONS

Japanese Office Action dated Nov. 16, 2020 in corresponding Japanese Application No. 2019-219190; 10 pgs.

(Continued)

*Primary Examiner* — Adetokunbo O Torimiro
(74) *Attorney, Agent, or Firm* — Maier & Maier, PLLC (57) ABSTRACT

An exemplary method of controlling a server that can provide a game can include associating a user with a group; determining, based on information related to activity of the user in at least one of the game and an event within the game, information related to activity of the group with which the user is associated; and providing a bonus to the group based on the information related to activity of the group.

20 Claims, 7 Drawing Sheets

(56) References Cited

U.S. PATENT DOCUMENTS

| | | | |
|---|---|---|---|
| 2004/0204226 | A1 | 10/2004 | Foster et al. |
| 2005/0282608 | A1 | 12/2005 | O'Halloran |
| 2008/0045341 | A1 | 2/2008 | Englman |
| 2009/0115133 | A1 | 5/2009 | Kelly et al. |
| 2009/0124363 | A1 | 5/2009 | Baerlocher et al. |

FOREIGN PATENT DOCUMENTS

| | | | |
|---|---|---|---|
| JP | 2011-229604 | A | 11/2011 |
| JP | 2013-135808 | A | 7/2013 |
| JP | 2013-138730 | A | 7/2013 |
| JP | 2013-202270 | A | 10/2013 |
| JP | 2014-018421 | A | 2/2014 |
| JP | 2014018377 | A | 3/2014 |
| JP | 2014-110860 | A | 6/2014 |
| JP | 5559402 | B1 | 7/2014 |
| JP | 2016-29963 | A | 3/2016 |
| WO | 2013/099337 | A1 | 7/2013 |

OTHER PUBLICATIONS

Following the social app "Love Game General Election"! "Voltage 2012 character general election" The official version of the head family has a surprise privilege for the winning character!?, PR Times [online], May 28, 2012, [Searched Nov. 10, 2020], URL: https://prtimes.jp/main/html/rd/p/000000086.000002633.html.

Japanese Office Action dated Apr. 14, 2021 in corresponding Japanese Application No. 2019-219190; 3 pgs.

Japanese Office Action dated Oct. 21, 2014 in corresponding Japanese Application No. 2014-152140; 2 pgs.

Japanese Office Action dated Mar. 31, 2015 in corresponding Japanese Application No. 2014-152140; 3 pgs.

Japanese Office Action dated Aug. 18, 2015, in connection with corresponding JP Application No. 2015-125874 (7 pgs.).

"Animaru Rabo", Kyoryoku Shite Chosen, "Chimu Misshon" Tojo (Cooperate to Challenge, Appearance of Team Mission), [online], Aug. 4, 2015, the date of the publication: Jun. 17, 2014, URL, http://info.hangame.co.jp/index/nhn?m=details&infono=10110 (4 pgs).

The Idolmaster Cinderella Girls, "Isshunen Kinen Kamu Bakku Kyampen (First Anniversary Comeback Campaign)", [online], Aug. 4, 2015, the date of the publication: Dec. 14, 2012, URL: http://seesaawiki.jp/imascg/d/%a5%ad5%e3%a5%f3%a5%da%a1%bc%a5%f3 (3 pgs.).

Japanese Office Action dated Dec. 22, 2015, in connection with corresponding JP Application No. 2015-125874 (5 pgs., including English translation).

JP Office Action dated Mar. 1, 2016, in connection with corresponding JP Application No. 2014-152140 (10 pgs., including English translation).

JP Office Action dated May 10, 2016, in connection with corresponding JP Application No. 2014-152140 (6 pgs., including English translation).

Office Action dated Apr. 24, 2018 of corresponding Japanese application No. JP2016-044490; 10 pgs.

Japanese Office Action dated Aug. 14, 2018 of corresponding application No. JP2016-044490; 9 pgs.

"[Melst capture] Let's acquire the basic knowledge of guild battle"; Famitsu App for smartphone game information; May 30, 2014; 26 pages with machine translation.

Merc Storia., "Healer and Suzu no Shirabe [Melst Strategy]"; Strategy Wiki; Jul. 17, 2014; 10 pages with machine translation.

Merc Storia., "The Healer and Bell's Investigation-Walkthrough Wiki"; Strategy Wiki; Jan. 22, 2019; 16 pages with machine translation.

Office Action dated Jun. 17, 2022, in connection with corresponding Japanese Application No. 2021-104469 (4 pp., including machine-generated English translation).

| User ID | Favorite character | Group |
|---------|--------------------|-------|
| U0001   | CH01               | G01   |
| U0002   | CH01               | G01   |
| U0003   | CH02               | G02   |
| U0004   | CH03               | G03   |

| Card ID | Character | Clothing | Team |
|---------|-----------|----------|------|
| CA01 | CH01 | D01 | T01 |
| CA02 | CH01 | D02 | T01 |
| CA03 | CH02 | D03 | T02 |
| CA04 | CH03 | D04 | T01 |
| CA05 | CH03 | D05 | T01 |
| CA06 | CH04 | D06 | T03 |
| CA07 | CH04 | D01 | T03 |
| ⋮ | ⋮ | ⋮ | ⋮ |

| User ID | Character voted for | Voting time | Group |
|---|---|---|---|
| U0001 | CH01 | 6/20 9:30 | G04 |
| U0002 | CH01 | 6/20 11:20 | G04 |
| U0004 | CH03 | 6/20 11:05 | G05 |
| U0005 | CH03 | 6/20 11:00 | G05 |
| U0006 | CH03 | 6/20 14:10 | G05 |
| U0007 | CH04 | 6/20 11:15 | G06 |
| U0009 | CH05 | 6/20 11:20 | G07 |

| User ID | Card subject to purchase reservation | Planned amount of purchase | Group |
|---------|--------------------------------------|----------------------------|-------|
| U0005   | CA05                                 | 100 coins                  | G08   |
| U0006   | CA05                                 | 100 coins                  | G08   |
| U0007   | CA06                                 | 150 coins                  | G09   |

FIG. 6

| User ID | Login time | Logout time | Group |
|---------|------------|-------------|-------|
| U0001 | 6/20 9:00 | 6/20 12:00 | G10 |
| U0002 | 6/20 9:02 | 6/20 11:50 | G10 |
| U0003 | 6/20 9:05 | null | G10 |
| U0004 | 6/20 9:08 | 6/20 13:00 | G10 |
| ⋮ | ⋮ | ⋮ | ⋮ |
| U0999 | 6/20 11:07 | null | G10 |
| U1000 | 6/20 11:09 | 6/20 18:30 | G11 |
| ⋮ | ⋮ | ⋮ | ⋮ |
| U1999 | 6/20 15:42 | null | G11 |
| U2000 | 6/20 15:45 | 6/20 20:20 | G12 |
| U2001 | 6/20 15:49 | 6/20 21:00 | G12 |
| U2002 | 6/20 15:52 | null | G12 |
| U2003 | 6/20 15:53 | null | G12 |
| ⋮ | ⋮ | ⋮ | ⋮ |

16e

METHOD OF CONTROLLING A SERVER, SERVER, AND NON-TRANSITORY COMPUTER-READABLE RECORDING MEDIUM

CROSS-REFERENCE TO RELATED APPLICATIONS

This application is a continuation of U.S. patent application Ser. No. 14/808,386, filed Jul. 24, 2015, which claims priority to and the benefit of Japanese Patent Application No. 2014-152140, filed Jul. 25, 2014, the entire contents of which are incorporated herein by reference.

FIELD

Exemplary embodiments relate to a method of controlling a server, to a server, and to a non-transitory computer-readable recording medium.

BACKGROUND

A game system that provides an individual user with a bonus based on individual participation status (play status) has been proposed (for example, JP 2014-018377 A).

SUMMARY

It is up to each user, however, whether to participate in a game. Therefore, simply providing a bonus to an individual based on individual participation status is insufficient for increasing interest in being active in the game.

It could therefore be helpful to provide a method of controlling a server, a server, and a non-transitory computer-readable recording medium that can increase user interest in being active in a game.

To that end, in one of the exemplary embodiments, a method of controlling a server that provides a game is a method that may include: associating a user with a group; determining, based on information related to activity of the user in at least one of the game and an event within the game, information related to activity of the group with which the user is associated; and providing a bonus to the group based on the information related to activity of the group.

In the above exemplary method, the associating may include associating, with the same group, at least one user that is related with the same target by user operation.

In the above exemplary method, the providing may include providing a bonus based on a degree of participation of the group.

In the above exemplary method, the providing may include changing a value of the bonus in accordance with participation, between users associated with the same group, that improves an activity status in at least one of the game and an event within the game.

Furthermore, in one of the exemplary embodiments, a server for providing a game to at least one terminal by communicating with the terminal is a server can include: circuitry configured to associate a user with a group; a determination, based on information related to activity of the user in at least one of the game and an event within the game, information related to activity of the group with which the user is associated; and a bonus provided to the group based on the information related to activity of the group. In the above server, the circuitry may be further configured to associate, with the same group, at least one user that is related with the same target by user operation.

Furthermore, in one of the exemplary embodiments, a non-transitory computer-readable recording, or storage, medium can record thereon instructions that may cause a computer that provides a game to: associate a user with a group; determine, based on information related to activity of the user in at least one of the game and an event within the game, information related to activity of the group with which the user is associated; and provide a bonus to the group based on the information related to activity of the group. In the above exemplary non-transitory computer-readable recording medium, the associating may include associating, with the same group, at least one user that is related with the same target by user operation.

Exemplary methods of controlling a server, server, and non-transitory computer-readable recording medium can provide a bonus to a group based on information relating to activity of the group as a whole, thereby, for example, providing a method of controlling a server, server, and non-transitory computer-readable recording medium that can increase user interest in being active in a game.

DETAILED DESCRIPTION

The following describes exemplary embodiments with reference to the drawings.

Figure 1:
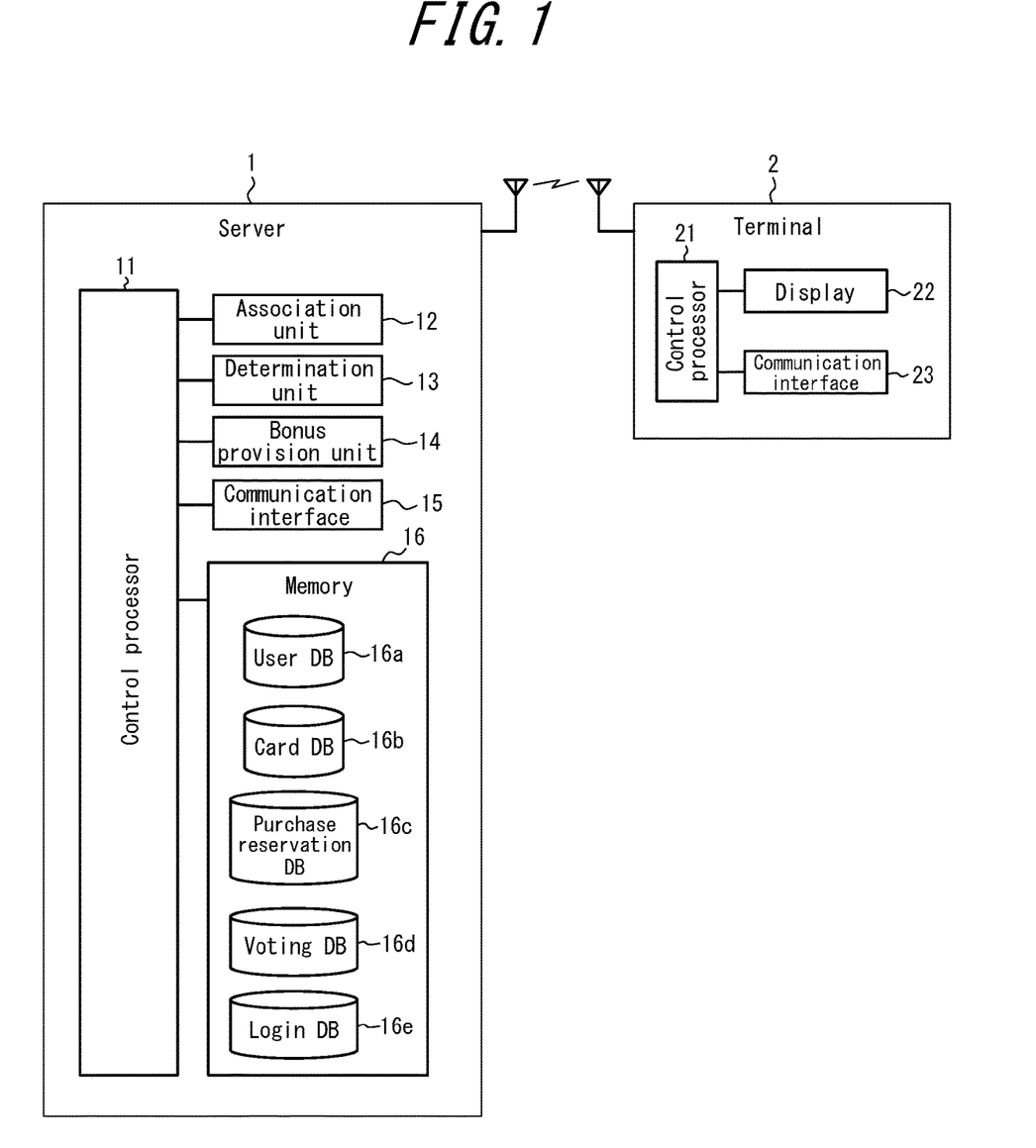
FIG. 1 is an exemplary functional block diagram of a server and a terminal according to one of the embodiments.

Exemplary FIG. 1 is a functional block diagram of a game system according to one of the embodiments. In this game system, a server 1 and a terminal 2 can communicate over a network. The number of servers 1 and terminals 2 is not restricted and it is envisioned that there may be any number of servers 1 and terminals 2, as desired. The terminal 2 may be a mobile terminal or a stationary terminal, and further exemplary embodiments may use both in combination.

The server 1 can include a control processor 11, an association unit 12, a determination unit 13, a bonus provision unit 14, a communication interface 15, and a memory 16. The server 1 can provide a game to the terminal 2. Various operations by the server 1 can be controlled by the control processor 11. Functions of the server 1 according to this exemplary embodiment are described, yet it is to be noted that other functions with which the server 1 is provided are not intended to be excluded.

The association unit 12 can associate users with groups. One or more users can be associated with one group. The standard by which the association unit 12 associates users with groups (also referred to as dividing users into groups) is described with respect to the exemplary embodiments below.

The determination unit 13 can determine information related to activity of a group in the game or an event within the game. Information related to activity can refer to information representing the activity status in the game or an event within the game. For example, the activity status may be the participation status (such as the participation rate, number of participants, or the like), exchange status (such as the ratio of transmission to reception of messages, number of transmissions and receptions, or the like), and/or participation period (such as total playing time or the like) or other such information with respect to the game or an event within the game. In this exemplary embodiment, the participation status may be described as an example of the activity status. The participation status of a group can be determined based on the participation status, in the game or an event within the game, of the users belonging to the group. The game can refer to a battle, quest, mission, or the like provided by the game system. Participating in the game can refer, for example, to participating in a battle, quest, mission, or the like, or to logging into the game system in order to participate in a battle, quest, mission, or the like. On the other hand, an event within the game can refer to an event, implemented by the game system, in which an activity takes place, such as the users voting, predicting a ranking, or the like. Participating in an event can refer, for example, to taking part in the activity of voting, predicting a ranking, or the like, or to logging into the game system in order to take part in such an activity. The way in which the determination unit 13 determines the participation status is described with respect to the exemplary embodiments below.

Based on the result of determination by the determination unit 13, the bonus provision unit 14 can select a bonus for the group and can provide the bonus to the group. "Providing a bonus to a group" can refer to providing a bonus to each user associated with a group (belonging to the group) or to providing a bonus to a group as a whole. The way in which the bonus provision unit 14 provides a bonus is described with respect to the exemplary embodiments below.

The communication interface 15 can transmit and receive information to and from the terminal 2. Communication may be wired or wireless, or both, as desired.

The memory 16 can include a user DB 16*a*, a card DB 16*b*, a purchase reservation DB 16*c*, a voting DB 16*d*, and a login DB 16*e*. Each database (DB) in the memory 16 may be stored outside of the server 1 and may be accessed by the server 1 when desired, requested, or otherwise as necessary.

The terminal 2 can include a control processor 21, a display 22, and a communication interface 23. Various operations by the terminal 2 can be controlled by the control processor 21. Functions of the terminal 2, according to this exemplary embodiment, are described, yet it is to be noted that other functions with which the terminal 2 is provided are not intended to be excluded.

The display 22 may be, for example, configured using a touch panel. The display 22 can display a variety of game screens and can also have a function to act as an interface to receive user input via user operation.

The communication interface 23 can transmit and receive information to and from the server 1. Communication may be wired or wireless, or both, as desired.

An outline of the game system in this exemplary embodiment may now be described. In the game system of this exemplary embodiment, a logged-in user can participate in a game or an event within the game using a game content. The game content can be electronic data used in the game and, for example, can include cards, items, characters, avatars, and the like. The game content can be electronic data that can be acquired, held, used, managed, exchanged, combined, strengthened, sold, discarded, and/or gifted or the like within the game by the user in accordance with game progress. The way in which the game content is used is not, however, limited to the examples in this disclosure. Status information unique to the game content may be combat strength, such as attack points and defense points of the game content, combat means, mechanisms, techniques and the like, such as attack means, mechanisms, techniques and the like and defense means, mechanisms, techniques and the like of the game content, the below-described exemplary skill information of the game content, information on the avatar of the game content, the below-described exemplary attribute of the game content, an index indicating the rarity value of the game content, or the like. The index indicating the rarity value of the game content may be expressed by levels such as normal, rare, super-rare, ultra-rare, and the like. In the following explanation, the game content may be assumed to be a card. At least one character can be depicted on a card. A variety of clothing may also be depicted in correspondence with the character on the card. At least one team can be associated with each character, and a team can be formed by one or more characters.

The user can change the status information of a card through a battle (a battle with another user, or a battle with a character controlled by the game system) or a quest, as desired. For example, by combining a card acquired in a predetermined battle or quest with a card the user already has, the user can strengthen a parameter such as the attack points or skill of the card. The user can also strengthen a parameter such as the attack points or skill of the card via a bonus (such as experience points or the like) that can be obtained in a predetermined battle or quest.

The user can also acquire an item as electronic data of a tool used in the game. The user may be allowed to change the status information of a card using an item. For example, the user may strengthen a parameter such as the attack points or skill of a card by using an item.

Furthermore, the game system can implement a predetermined event within the game in which the user can participate. For example, when a predetermined condition is satisfied, such as the user logging into the game system, the game system can implement an event to show any card to the user. The user can make a reservation to purchase a predetermined card using virtual game currency. When making a purchase reservation, the user can designate a planned amount of purchase (for example, a number of coins). The game system may collect data, for example at 23:59 each day (or at any other desired time or upon any desired condition being met), on the card for which each user makes a purchase reservation and the planned amount of purchase, and based on the result of collecting data, can determine whether the purchase reservation is successful. When the purchase reservation is successful, the game system can provide a bonus to the user (for example, the card for which the user made the purchase reservation).

The game system, for example, can implement a voting event at a predetermined time each day. In the voting event, the user can vote for a card, a character depicted on a card, or the like. The game system can collect data at a predetermined time on user voting, and, based on the results of collecting data, can provide a bonus (for example to user(s) who voted for the card that gathered the most votes). For example, the user may acquire a card or the like as the bonus. The bonus may be the card that is most often selected by users from among a plurality of bonus candidates.

In coordination with an event occurring in the real world, the game system can also implement an event to predict ranking. For example, the characters on cards may be real people, and the people may be ranked by a real election. In the game system, the user can predict the ranking that will be determined by the real election. The game system may collect data at a predetermined time on the user's prediction, and based on the results of collecting data, can provide a bonus (for example to user(s) whose prediction was correct).

The game system may, for example, also implement a raid battle event at a predetermined time each day. In this case, any number of users can belong to a group that may be determined, through user selection or through selection by the game system, and participate in a battle for the purpose of defeating a raid boss. The game system may, for example, also implement a guild battle at a predetermined time each day. In this case, any number of users may belong to groups that can be determined through user selection or through selection by the game system, and can participate in a battle between groups.

When a certain user uses a notification function in the game system to transmit (spread) information concerning an event to other users in the same group, the game system may provide a predetermined bonus to the user or to the group. Specifically, when the event is a voting event, then upon a certain user notifying other users in the same group of information concerning an event, the game system may allow the user to cast an extra vote in addition to the user's regular vote.

Specific processing performed by the game system in this exemplary embodiment may now be described. First, the way in which the game system can associate users with groups is described. During association processing, the association unit 12 can associate, with the same group, at least one user that was related with the same target by user operation. Specifically, the below-described methods may be used with respect to the exemplary embodiments.

A first exemplary method can be a method to associate users with a group based on the character registered by each user. For example, this may be a method to associate users that have the same favorite character with the same group. In the game, the user can register at least one character in which the user is personally interested as a "favorite" in the user DB 16*a* illustrated in exemplary FIG. 2. The game system may automatically determine the user's favorite character from the card usage rate (for example, based on the length of time a card is included in a deck used in a battle or on the frequency of use during a battle) or the like. After this determination, the game system can register the favorite character in the user DB 16*a* illustrated in exemplary FIG. 2.

Next, the association unit 12 can refer to the user DB 16*a* to associate, with the same group, users having the same favorite character. For example, in the example illustrated in exemplary FIG. 2, the association unit 12 can associate users U0001 and U0002, whose favorite is character CH01, with group G01.

Figure 3:
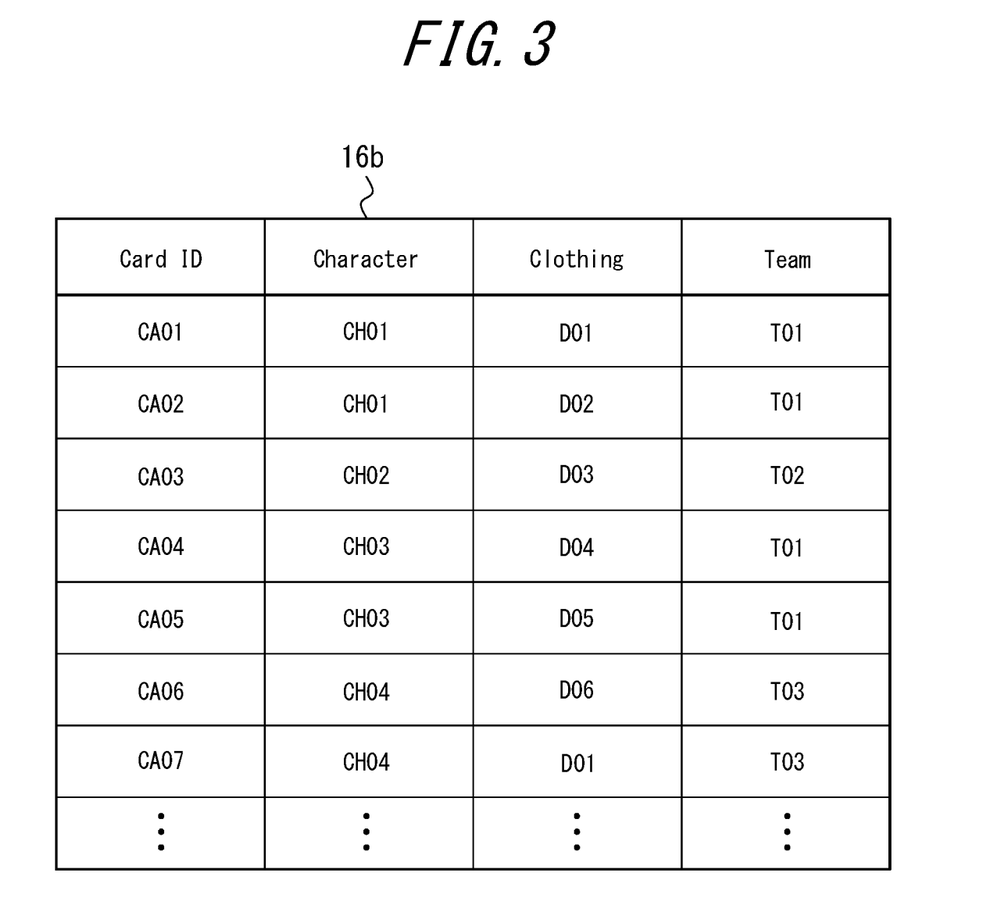
FIG. 3 is an exemplary diagram that illustrates a card DB 16$b$ in a game system according to one of the embodiments.

As illustrated in the card DB 16*b* in exemplary FIG. 3, each card can be associated with a card ID, and a number of pieces of status information can be registered. Specifically, a character, clothing, and team can each be registered as status information. The "favorite" need not be only a character and may also be a card (and the same character may be depicted on a plurality of cards in accordance with the season), or a character's clothing or team. In this case, the association unit 12 can associate users having the same favorite card, or the same character's clothing or team, with the same group.

The first exemplary method may also be a method to associate, with the same group, the user that voted for the same character at the time of a voting event. For example, as illustrated in the voting DB 16*d* of exemplary FIG. 4, the association unit 12 can associate users U0004, U0005 and U0006, who voted for the same character CH03, with group G05.

Figure 4:
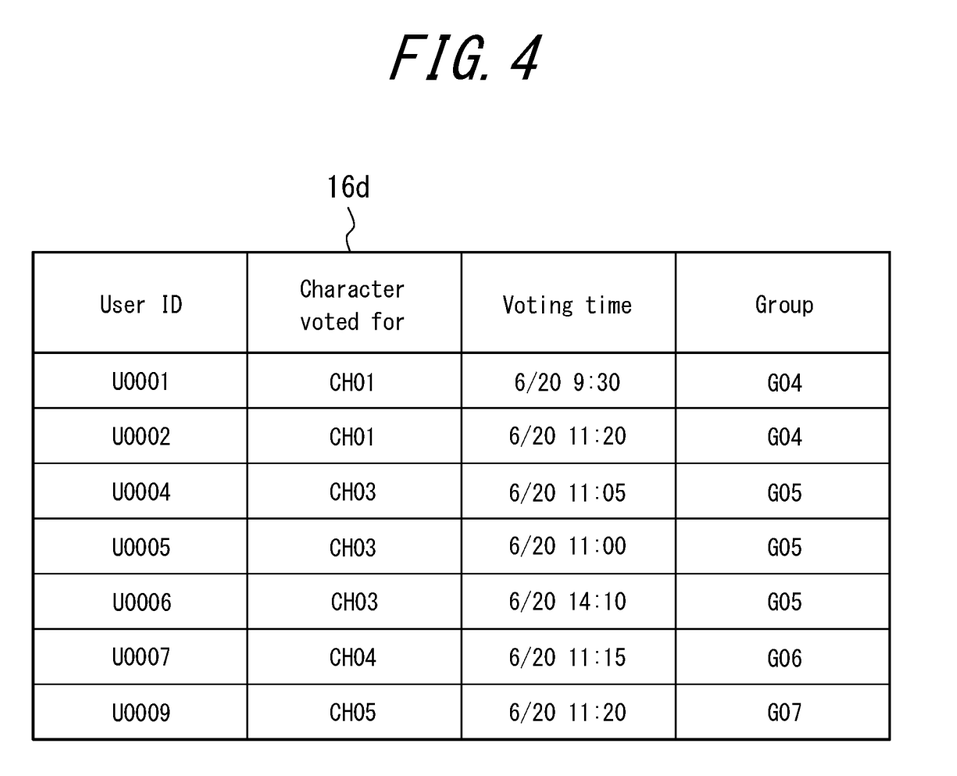
FIG. 4 is an exemplary diagram that illustrates a voting DB 16$d$ in a game system according to one of the embodiments.

By configuring the system to allow for voting not for a character but rather for a card, clothing, or a team, the association unit 12 may also associate, with the same group, the users who voted for the same character, the same clothing, or the same team.

Figure 2:
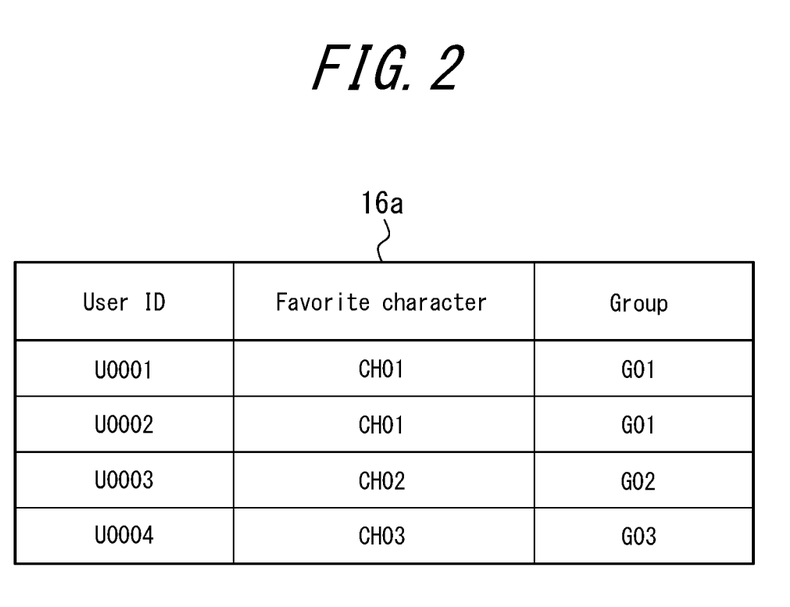
FIG. 2 is an exemplary diagram that illustrates a user DB 16$a$ in a game system according to one of the embodiments.

In the same way that the user registers a favorite character, the user may register a character, card, or group (guild) that the user wishes to defeat, or a card or character that the user wishes to obtain, in the user DB 16*a*. In this example, the association unit 12 can refer to the user DB 16*a* and can associate, with the same group, the users that wish to defeat or obtain the same character, card, or group (guild).

A second exemplary method can be a method to associate, with the same group, users that are related to a target to the same degree. The second method can be, for example, a method to associate, with the same group, users that were related to the same card by designating the same planned amount of purchase at the time of making a purchase reservation for the same card. Specifically, in the example of the purchase reservation DB 16*c* illustrated in exemplary FIG. 5, the association unit 12 can associate, with the same group G08, users U0005 and U0006 who made a purchase reservation with a planned amount of purchase of 100 coins for the same card CA05 that was subject to a purchase reservation.

Other exemplary methods can include a method to associate users with a group in accordance with the time, number, and/or order of user operations. For example, users may be associated with a group in accordance with the order in which they log into the game system. In this exemplary method, for example as illustrated in the login DB 16*e* in exemplary FIG. 6, the association unit 12 can associate the $1^{st}$ to the $999^{th}$ user to log in with G10, can associate the $1000^{th}$ to the $1999^{th}$ user to log in with G11, and can associate the $2000^{th}$ to the $2999^{th}$ user to log in with G12 (and so on, for example).

Apart from the above exemplary methods, the server may arbitrarily divide users into groups. The association unit 12 may also recombine groups with the same method or a different method after a predetermined time has elapsed. The association unit 12 may recombine groups each time the bonus provision unit 14 provides a bonus.

The association unit 12 may divide users into groups based on the activity status of each user before dividing users into groups. For example, when determining the participation status based on the number of logins of users included in each group, if users with many logins during a predetermined past time period are placed in a group, the total number of logins by users included in that group may be more likely to increase. As a result, the participation status of the group may be more likely to be determined as being better than the participation status of other groups, thus biasing the determination results. To address this issue, the association unit 12 may divide users into groups so that users with many logins during a predetermined past time period are not placed in the same group.

Furthermore, the association unit 12 may have a predetermined user or have each user perform the division into groups. In this example, in the game system, each user may select which group to belong to, or a predetermined user may select the users that belong to a group.

The display 22 of the terminal 2 may display the result of dividing into groups as retrieved from the association unit 12. For example, the display 22 may display the group to which each user belongs and information that served as the standard for determining the division into groups. Specifically, the display 22 may display the group to which each user belongs and the number of logins, number of votes, target of voting, and/or favorite character that served as the standard for determining the division into groups. In this way, competition and cooperation between users can increase, and users can be more motivated to participate.

The following examples describe how to determine a participation status of a group with which users are associated, based on a participation status of the users in at least one of the game and an event within the game.

First, when executing the association processing via the above-described first exemplary method, one method can be to refer to the voting DB 16*d* in exemplary FIG. 4 and provide a bonus to the group with the highest voting rate among the groups (one index of the degree of activity). In this example, the determination unit 13 may determine the group to which each user belongs based on the user DB 16*a* in exemplary FIG. 2 and determine the number of voters in each group based on the voting DB 16*d* in exemplary FIG. 4. Referring to the user DB 16*a* in FIG. 2 and the voting DB 16*d* in exemplary FIG. 4, the number of users that voted in each group (G01 to G03) is two users in G01, zero users in G02, and one user in G03. In this case, the determination unit 13 can determine to provide a bonus to G01.

Figure 6:
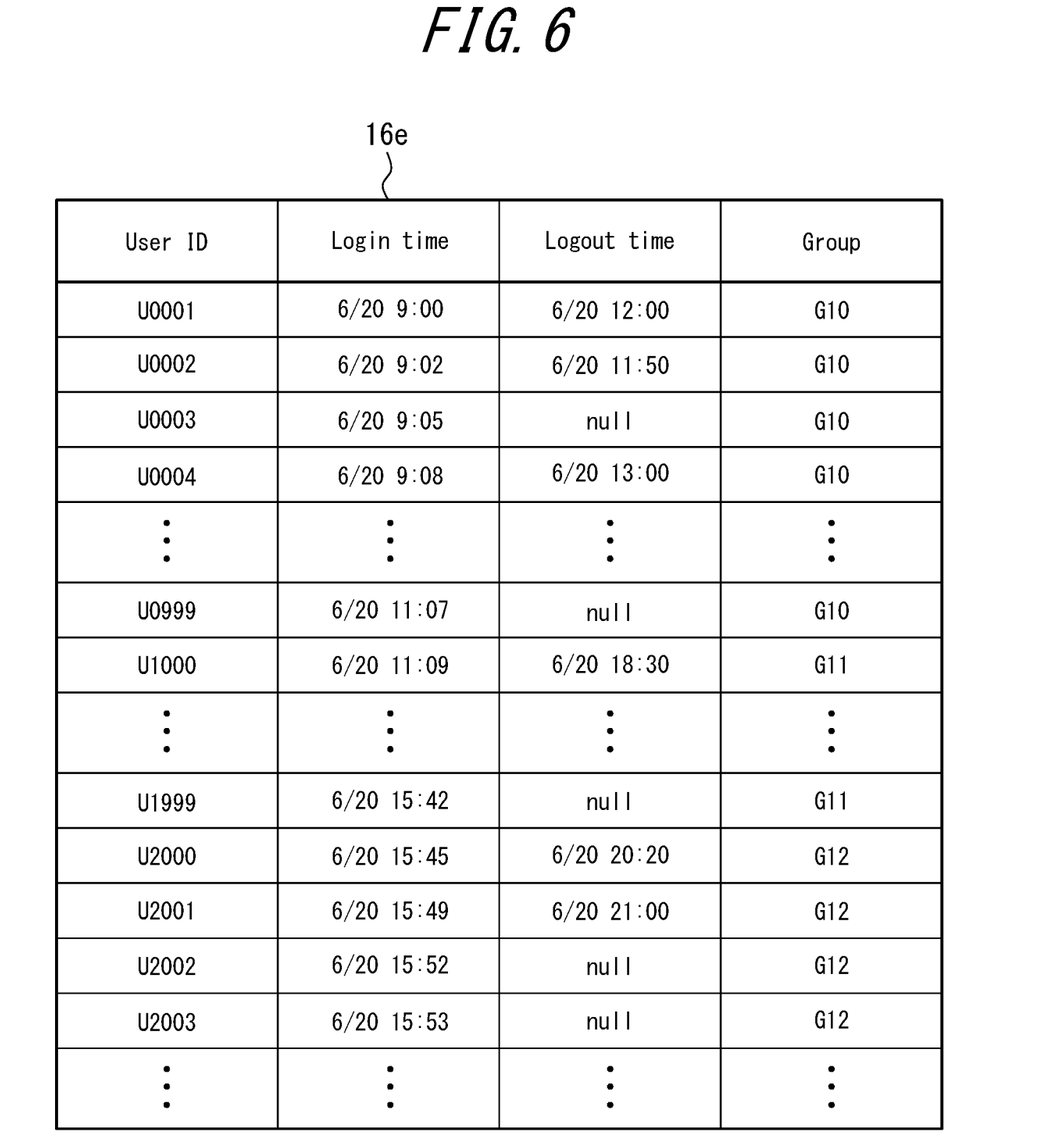
FIG. 6 is an exemplary diagram that illustrates a login DB 16$e$ in a game system according to one of the embodiments.

When executing the association processing via the above-described first exemplary method, the determination unit 13 may refer to the login DB 16*e* in exemplary FIG. 6 and can provide a bonus to the group with the highest login rate (one index of the degree of activity). In this example, the determination unit 13 may determine the group to which each user belongs based on the user DB 16*a* in exemplary FIG. 2 and determine the login rate of each group based on the login DB 16*e* in FIG. 6. Referring to the login DB 16*e* in exemplary FIG. 6, the number of users currently logged in within each group (G01 to G03) is zero users in G01, one user in G02, and zero users in G03. In this case, the determination unit 13 determines to provide a bonus to G02.

Furthermore, the determination unit 13 may determine the participation status based not only on the voting rate or the login rate, but also on the number of votes, number of quests cleared, or the like.

When executing the association processing via the above-described first exemplary method, the determination unit 13 may refer to the voting DB 16*d* and provide a bonus to the group with the largest or smallest number of users among the groups (one index of the degree of activity). In this example, the determination unit 13 may determine the group to which each user belongs and the number of users in each group based on the voting DB 16*d* in exemplary FIG. 4. Among the groups (G04 to G07), the number of users in each group who voted for the same character is two users in G04, three users in G05, one user in G06, and one user in G07. When providing a bonus to the group with the largest number of users, the determination unit 13 can determine to provide a bonus to G05. Conversely, when providing a bonus to the group with the smallest number of users, the determination unit 13 may determine to provide a bonus to G06 and G07.

When executing the association processing via the above-described first exemplary method, the determination unit 13 may also refer to the voting time in the voting DB 16*d* and provide a bonus to the group with the largest number of users who voted within a predetermined time period (one index of the degree of activity). For example, when providing a bonus to the group with the largest number of users who voted between 11:00 and 11:59 (or as a result of any other set condition or conditions), the determination unit 13 may determine to provide a bonus to G05 (two users).

Next, when executing the association processing via the above-described second exemplary method, one exemplary method can be to refer to the purchase reservation DB 16*c* and provide a bonus to the group with the smallest number of users among the groups (one index of the degree of activity). In this example, the determination unit 13 may determine the group to which each user belongs and the number of users in each group based on the purchase reservation DB 16*c* in exemplary FIG. 5. Referring to the purchase reservation DB 16*c* in exemplary FIG. 5, the number of users who made a purchase reservation in each group (G08, G09) is two users in G08 and one user in G09. In this case, the determination unit 13 determines to provide a bonus to G09.

Figure 5:
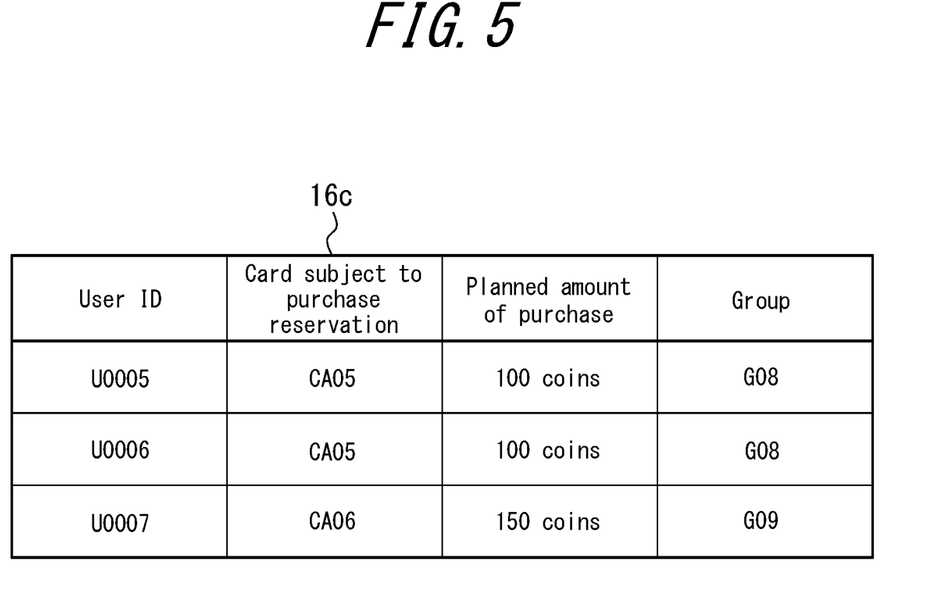
FIG. 5 is an exemplary diagram that illustrates a purchase reservation DB 16$c$ in a game system according to one of the embodiments.

When executing the association processing via the above-described second exemplary method, the determination unit 13 may refer to the purchase reservation DB 16*c* in exemplary FIG. 5 and provide a bonus to the group that designated the smallest planned amount of purchase (lowest price) or the largest planned amount of purchase (highest price) (one index of the degree of activity). In this example, the determination unit 13 may determine the group to which each user belongs and the lowest price or highest price of each group based on the purchase reservation DB 16*c* in exemplary FIG. 5. Referring to the purchase reservation DB 16*c* in exemplary FIG. 5, the planned amount of purchase designated by each group (G08, G09) is 100 coins for G08 and 150 coins for G09. When providing a bonus to the group that designated the smallest planned amount of purchase, the determination unit 13 determines to provide a bonus to G08. Conversely, when providing a bonus to the group that designated the largest planned amount of purchase, the determination unit 13 determines to provide a bonus to G09.

The determination unit 13 may determine to provide a bonus to the group that designated an amount that is the lowest price and that does not overlap with the planned amount of purchase of another group. In this example, the determination unit 13 may determine to provide a bonus to G09.

Additionally, when executing the association processing via the above-described exemplary method to associate users with a group in accordance with the order in which they log into the game system, one exemplary method can be to refer to the login DB 16*e* and provide a bonus to the group with the highest number of logins (or login rate) among the groups (one index of the degree of activity). In this example, the determination unit 13 may determine the group to which each user belongs and the number of logins (or login rate) within each group based on the login DB 16*e* in exemplary FIG. 6. When a user logs out, the game system can record the logout time in the login DB 16*e* in exemplary FIG. 6. The determination unit 13 can refer to the login DB 16*e*, may calculate the number of logins or the login rate of users in each group at a predetermined point in time, and can provide a bonus.

Another exemplary method can be to provide a bonus based on existing groups formed by the above-described association processing. In this example, the determination unit 13 can make a determination based on the past activity history and current activity history of users and groups (one index of the degree of activity). For example, the determination unit 13 may compare the login rate during the previous event with the login rate during the current event for users belonging to a certain group and determine to provide a bonus in accordance with the increase in login rate. In this way, the determination unit 13 can determine to provide a bonus in accordance with improvement in activity status even when there is a difference in the activity status of the groups. Therefore, even users belonging to a group with a poor activity status can be motivated to improve the activity status.

The following exemplary discussion describes a manner of providing a bonus to the group determined to receive a bonus in the processing to determine participation status (i.e. the group determined to have a good participation status). The bonus provision unit 14 can provide a bonus based on the degree of participation of the group. Specifically, exemplary methods, such as those described below, may be used.

When the bonus provision unit 14 provides a bonus to each user, the bonus may encourage users to log in, for example, in order to increase interest in being active in the game. The bonus may, for example, be a card that can only be acquired with a login bonus (a bonus for logging in), a card ranked highly by user voting, an item, game currency, or the like.

When the bonus provision unit 14 provides a bonus to a group as a whole, the bonus may be game currency used to manage the group, an item usable in a battle between groups, or the like.

The bonus provision unit 14 may provide any number of groups with a bonus that is incrementally different in accordance with the participation status of the groups.

The user to whom the bonus is provided may be allowed to select the bonus from among any number of candidate bonuses.

Furthermore, the bonus provision unit 14 may change the value of the bonus in accordance with participation, between users associated with the same group, that improves the activity status in at least one of the game and an event within the game. For example, the bonus provision unit 14 may increase the value of the bonus when a user in a group performs an action to improve the activity status. When the activity status improves as a result of the above action to improve the activity status, the bonus provision unit 14 may further increase the value of the bonus. Specifically, for example, when a certain user sends a message inviting another user in the same group to participate in a predetermined game or an event within the game during a predetermined time period, the bonus provision unit 14 may increase the value of the bonus for the group with which the user is associated. Increasing the value of the bonus can refer, for example, to increasing the number of bonuses, changing to a higher-value bonus, and/or increasing the rate of bonus acquisition. Alternatively, the bonus provision unit 14 may increase the value of the bonus only when the user who received the invitation message actually participates in the event.

Even in exemplary situations where the activity status does not improve as a result of an action to improve the activity status, the bonus provision unit 14 may increase the value of the bonus by positively evaluating the fact that an attempt was made to improve the activity status. Specifically, for example, even when the user that received the invitation message does not actually participate in the event, the bonus provision unit 14 may positively evaluate the fact that the action of sending a message occurred within the group and increase the value of the bonus.

The bonus provision unit 14 may also increase the value of the bonus in accordance with the number of times a certain user has assisted another user in the group or with the content of the assistance. Specifically, for example the bonus provision unit 14 may set the value of the bonus by considering the content of the assistance to be the activity (the number of enemies defeated, damage inflicted on enemies, or the like) in the game, such as a battle in which the user assisted. The bonus provision unit 14 may also increase the value of the bonus in accordance with the number of times a certain user has cooperated with another user in the same group (for example, participated in a quest or a battle together) or the content of the cooperation. Specifically, for example, the bonus provision unit 14 may set the value of the bonus by considering the content of the cooperation to be the activity (number of attacks launched in cooperation (such as number of combos or the like), number of enemies defeated in cooperation, or the like) within the game, such as in a battle in which a certain user fights in cooperation with another user in the same group. Furthermore, the bonus provision unit 14 may increase the value of the bonus in accordance with the number of times a certain user invites another user to join the same group or with in-game status information about the invited user.

The bonus provision unit 14 may increase the value of the bonus in accordance with content of an action performed by a user to improve the activity status. For example, the bonus provision unit 14 may increase the value of the bonus in accordance with the status of the target of the action performed by the user, or the difference in status information between the user and the target. Specifically, in the example described here, a certain user can transmit a notification (notification encouraging renewed participation in the game (for example, a message)) encouraging another user, in the same group, who has not logged into the game for a predetermined time period to come back. In this example, the bonus provision unit 14 may increase the value of the bonus in accordance with the length of the time period that the other user has not logged in.

The bonus provision unit 14 may also increase the value of the bonus in accordance with the difference in the status information in the game system between a user who responds to a request for assistance or cooperation and another user who issued the request for assistance or cooperation. Specifically, in this example, the bonus provision unit 14 may increase the value of the bonus further as the difference between the users is larger in terms of level, strength of the deck, play time and/or degree of progress on a quest or the like. This approach can provide a motive for assisting a user with lower status information (i.e. a beginner) and a motive for cooperating with such a user.

Furthermore, the bonus provision unit 14 may change the bonus or the rate of bonus acquisition in accordance with the login rate, voting rate, or the like in a predetermined time period (for example, during an event, or during a time slot in which the number of logged in users is smaller/larger than a threshold).

Figure 7:
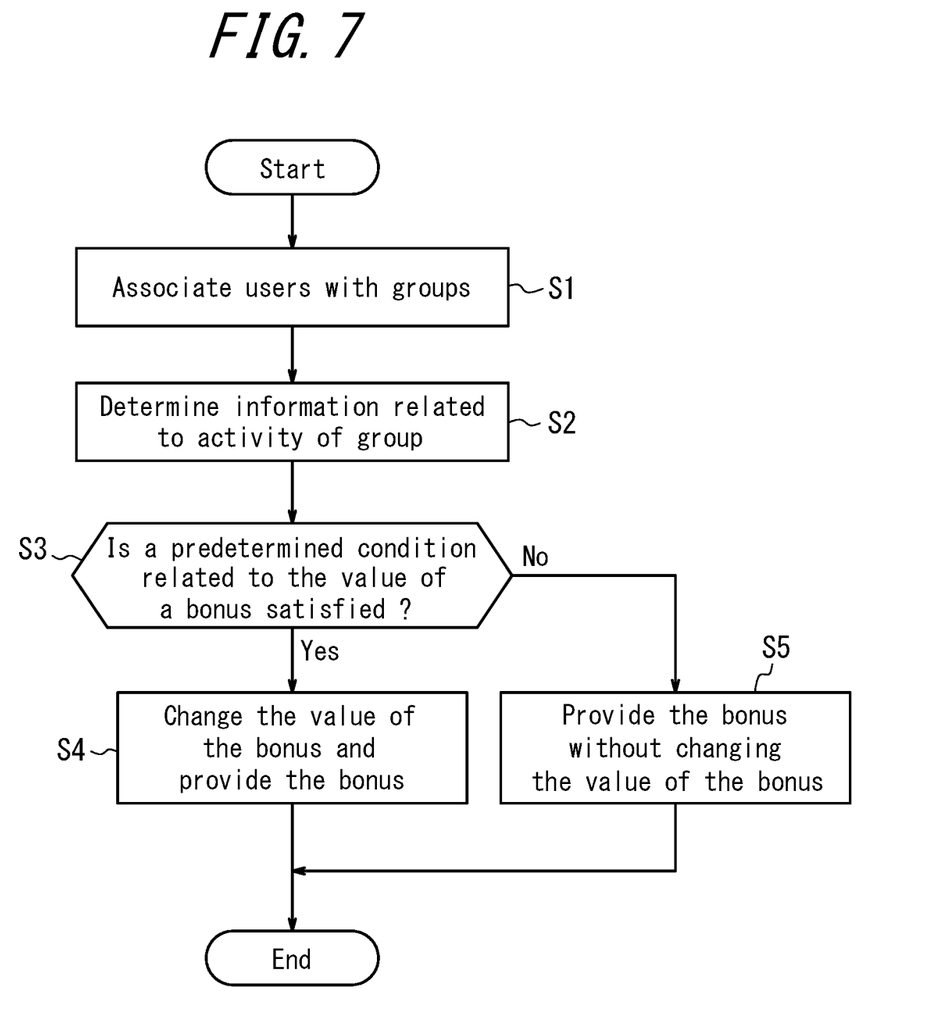
FIG. 7 is an exemplary flowchart for a server in a game system according to one of the embodiments.

Exemplary FIG. 7 is a flowchart for the server 1 according to one of the exemplary embodiments. The server 1 can associate users with groups based on the favorite character, the planned amount of purchase designated by users when making a purchase reservation, the character voted for, the order of login, or the like (step S1). Next, based on information related to activity of a user in at least one of the game and an event within the game, the server 1 can determine information related to activity of the group with which the user is associated (step S2). To make the determination, the server 1 can use the voting rate, login rate, number of votes, number of quests cleared, or the like.

The server 1 may then determine whether a predetermined condition related to the value of the bonus is satisfied (step S3). The predetermined condition can be, for example, "information related to activity during a predetermined time period", "whether notification related to a predetermined game or an event within the game was provided to another user in the same group", "whether another user, in the same group, who has not been active in the game or an event within the game for a predetermined time period was encouraged to be active again", or the like. When determining that the above predetermined condition has been satisfied (step S3: Yes), the server 1 can change the value of the bonus and provide the bonus to the group based on the information related to activity of the group (step S4). Conversely, when determining that the above predetermined condition has not been satisfied (step S3: No), the server 1 can provide the bonus to the group based on the information related to activity of the group, without changing the value of the bonus (step S5).

As described above, for example by providing a bonus to groups in accordance with the login rate of the groups or the like, the server 1 can establish a motive for users to log in. It is thus possible to increase user interest in being active in a game by the server 1 providing a bonus to a group based on information relating to activity of the group as a whole.

When the server 1 connects with a terminal 2 over a network, as in this exemplary embodiment, the terminal 2 can display a progress screen for the game or an event within the game as a web display screen based on data generated by the server 1. In this case, using a native display that displays other menu screens and the like via a native application installed on the terminal 2 can allow for the game to be a hybrid game, where the server 1 and the terminal 2 may each be responsible for a portion of the processing of the hybrid game.

When at least one of the server 1 and the terminal 2 is configured with a computer, a program containing a description of the processing for achieving the functions can be stored within the computer or in an external memory, and the functions can be achieved by the central processing unit (CPU) of the computer reading and executing the program. Such a program may, for example, be distributed by the sale, transfer, lending, or the like of a portable recording medium such as a DVD, CD-ROM, or the like. Such a program may also, for example, be distributed by being stored in the memory of a server on a network and may then transferred from the server to another computer over the network. For example, the computer that executes such a program can temporarily store, in its own memory, the program recorded on the portable recording medium or transferred from the server. As another exemplary embodiment of the program, a computer may read the program directly from the portable recording medium and execute processing in accordance with the program, or each time the program is transferred from the server to the computer, the computer may execute processing in accordance with the received program.

This disclosure is based on the drawings and embodiments, yet it is to be noted that those skilled in the art could easily make various changes and modifications based on this disclosure. Therefore, such changes and modifications are to be understood as included within the scope of the disclosure. For example, the functions and the like included in the various functional units and steps may be reordered in any logically consistent way. Furthermore, functional units or steps may be combined into one or divided.

The invention claimed is:

1. A method of controlling a server that provides a game, the method comprising:

associating, using an association unit stored in a memory controlled by a control processor connected to a communication interface, a user with a group provided within the game, wherein the game is configured to engage the group in at least one activity in at least one of the game and an event within the game, said activity comprising using at least one game content provided within the game, said game content being an in-game object having fixed object-specific attribute information uniquely associated with the in-game object, said in-game object further having at least one mutable parameter associated with the in-game object and configured to be adjusted through gameplay;

determining, using a determination unit stored in the memory controlled by the control processor connected to the communication interface, based on information related to activity of the user in at least one of the game and an event within the game, information related to activity of the group with which the user is associated, and further evaluating, based on the information related to the activity of the group with which the user is associated, whether a predetermined condition relating to activity of the group has been satisfied; and selecting, using a bonus provision unit stored in the memory controlled by the processor connected to the communication interface, a bonus to be provided to the group based directly on the determination, by the determination unit, of information related to activity of the group as a whole in at least one of the game and the event within the game and evaluation of whether the predetermined condition relating to activity of the group has been satisfied;

wherein said bonus comprises a second game content provided within the game, said second game content being a second in-game object having fixed object-specific attribute information uniquely associated with the second in-game object.

2. The method of claim 1, wherein the predetermined condition relating to activity of the group with which the user is associated is specified as part of a process of designating a target, and further comprising:

associating, based on at least one user operation, at least one other user related to the same target with the group with which the user is associated.

3. The method of claim 2, wherein the method further comprises designating, as the target of the user and the at least one other user, a game content associated with a purchase reservation of the user and the at least one other user.

4. The method of claim 2, wherein the method further comprises designating, as the target of the user and the at least one other user, a game content associated with a vote of the user and the at least one other user.

5. The method of claim 2, wherein the method further comprises designating, as the target of the user and the at least one other user, a favorite game content of the user and the at least one other user based on a usage rate of the game content.

6. The method of claim 1, wherein the information related to activity of the group as a whole in the at least one of the game and the event within the game is a degree of participation of the group.

7. The method of claim 6, wherein the degree of participation of the group is determined as at least one of: a voting rate of the group, a login rate of the group, a number of votes of the group, a number of quests cleared by the group, and a total playing time of the group.

8. The method of claim 7, wherein the degree of participation of the group is determined as the voting rate of the group, and the method further comprises awarding, to the user, an extra vote based on a use of a notification function by the user.

9. The method of claim 1, wherein the method further comprises changing a value of the bonus in accordance with participation, between users associated with the group, that improves an activity status in at least one of the game and an event within the game.

10. The method of claim 9, wherein changing the value of the bonus comprises at least one of: increasing a number of bonuses awarded, changing the bonus to a higher-value bonus, and increasing a rate of bonus acquisition.

11. The method of claim 1, wherein the information related to activity of the group as a whole in the at least one of the game and the event within the game comprises message exchange status for the group as a whole.

12. The method of claim 11, wherein the message exchange status is determined as at least one of: a ratio of transmission to reception of messages between members of the group, and a number of transmissions and receptions of messages between members of the group.

13. The method of claim 1, wherein the information related to activity of the group as a whole in the at least one of the game and the event within the game comprises battle cooperation status for the group as a whole.

14. The method of claim 13, wherein the battle cooperation status is determined as at least one of: a number of attacks launched in cooperation by members of the group, a number of combo moves executed by members of the group, and a number of enemies defeated in cooperation by members of the group.

15. The method of claim 1, wherein the information related to activity of the group as a whole in the at least one of the game and the event within the game comprises a performance of the group in a battle event, said battle event configured to occur at a predetermined time each day.

16. The method of claim 1, further comprising, following the step of selecting the bonus to be provided to the group, recombining a plurality of members of the group into at least one other group.

17. The method of claim 1, wherein a step of associating the user with the group is based on a login order of the user and at least one other user.

18. The method of claim 1, wherein a step of associating the user with the group is based on a total number of logins among members of the group during a predetermined past time period.

19. A server for providing a game to at least one terminal by communicating with the terminal, the server comprising:
a control processor;
a memory;
a communication interface;
an association unit stored in the memory controlled by the control processor connected to the communication interface, configured to associate a user with a group provided within the game, wherein the game is configured to engage the group in at least one activity in at least one of the game and an event within the game, said activity comprising using at least one game content provided within the game, said game content being an in-game object having fixed object-specific attribute information uniquely associated with the in-game object, said in-game object further having at least one mutable parameter associated with the in-game object and configured to be adjusted through gameplay;
a determination unit stored in the memory controlled by the control processor connected to the communication interface, configured to determine based on information related to activity of the user in at least one of the game and an event within the game, information related to activity of the group with which the user is associated, and further evaluating, based on the information related to the activity of the group with which the user is associated, whether a predetermined condition relating to activity of the group has been satisfied; and
a bonus provision unit stored in the memory controlled by the processor connected to the communication interface, configured to select a bonus to be provided to the group based directly on the determination, by the determination unit, of information related to activity of the group as a whole in at least one of the game and the event within the game and evaluation of whether the predetermined condition relating to activity of the group has been satisfied;
wherein said bonus comprises a second game content provided within the game, said second game content being a second in-game object having fixed object-specific attribute information uniquely associated with the second in-game object.

20. A non-transitory computer-readable recording medium storing instructions to be executed by a server device that controls a game causing a computer that provides a game to:
associate, using an association unit stored in a memory controlled by a control processor connected to a communication interface, a user with a group provided within the game, wherein the game is configured to engage the group in at least one activity in at least one of the game and an event within the game, said activity comprising using at least one game content provided within the game, said game content being an in-game object having fixed object-specific attribute information uniquely associated with the in-game object, said in-game object further having at least one mutable parameter associated with the in-game object and configured to be adjusted through gameplay;
determine, using a determination unit stored in the memory controlled by the control processor connected to the communication interface, based on information related to activity of the user in at least one of the game and an event within the game, information related to activity of the group with which the user is associated, and further evaluating, based on the information related to the activity of the group with which the user is associated, whether a predetermined condition relating to activity of the group has been satisfied; and
select, using a bonus provision unit stored in the memory controlled by the processor connected to the communication interface, a bonus to be provided to the group based directly on the determination, by the determination unit, of information related to activity of the group as a whole in at least one of the game and the event within the game and evaluation of whether the predetermined condition relating to activity of the group has been satisfied;

wherein said bonus comprises a second game content provided within the game, said second game content being a second in-game object having fixed object-specific attribute information uniquely associated with the second in-game object.

* * * * *